United States Patent [19]

Tanaka

[11] Patent Number: 4,859,816
[45] Date of Patent: Aug. 22, 1989

[54] SELF CANCELLER FOR A TURN SIGNAL INDICATOR

[75] Inventor: Masao Tanaka, Tokyo, Japan

[73] Assignee: Metro Denso Kabushiki Kaisha, Kawasaki, Japan

[21] Appl. No.: 157,722

[22] Filed: Feb. 22, 1988

[51] Int. Cl.$^4$ .............................................. H01H 3/16
[52] U.S. Cl. ............................. 200/61.27; 200/61.3; 200/61.34; 200/61.35
[58] Field of Search ................. 200/61.27–61.38, 200/61.54

[56] References Cited

U.S. PATENT DOCUMENTS

| | | | |
|---|---|---|---|
| 4,123,632 | 10/1978 | Muto ................................ | 200/61.27 |
| 4,351,991 | 9/1982 | Morita et al. ................. | 200/61.35 X |
| 4,570,041 | 2/1986 | Ishiguro ........................ | 200/61.34 X |

*Primary Examiner*—J. R. Scott
*Attorney, Agent, or Firm*—Wenderoth, Lind & Ponack

[57] ABSTRACT

A self-canceller for a turn signal indicator comprises the following features: (a) its body has a retaining element with three recesses formed therein; (b) the body is provided with a movable bracket capable of rotating; (c) a control lever is fastened to the movable bracket; (d) two side stoppers, a center stopper, and a spring housing are fastened to the movable bracket; (e) an engaging ball and a compression spring are contained in the spring housing; (f) a ratchet mount is provided between the center stopper and the compression spring; (g) the compression spring is supported by the engaging ball at one end and by the ratchet mount at the other end; (h) the engaging ball can be engaged with any of the three recesses of the body according to the rotary movement of the movable bracket; (i) two cancel ratchets are formed on the ratchet mount; and (j) when the cancel cam moving in the rotating direction of the control lever makes contact with either of the cancel ratchets, the ratchet mount can rotate about a point on the center stopper as a pivot against the compressing spring. When one of the cancel ratchets of the ratchet mount contacts and interferes with the cancel cam during the movement of the ratchet mount by the operation of the control lever, depending on the rotating position of the steering wheel, it is necessary to add only a very small force for compressing the compression spring, as opposed to the otherwise ordinary control force previously necessary, to operate the control lever against such interference.

1 Claim, 1 Drawing Sheet

SELF CANCELLER FOR A TURN SIGNAL INDICATOR

BACKGROUND OF THE INVENTION

The present invention relates to a self-canceller for a turn signal indicator used in motor vehicles, etc.

FIG. 3 is a partial plan view showing a conventional self canceller for a turn signal indicator. This drawing shows a state where an engaging ball 1 is engaged with a left recess 14 of a retaining element 2 with the control lever 10 (see FIG. 2) turned counterclockwise, that is, a state where the flasher indicates a left-turn. For example, engaging ball 1 has been moved from a neutral recess 15 to the left recess 14 by moving leftwards in the direction of the arrow as viewed in FIG. 2. If the steering wheel is rotated counterclockwise in this state, a cancel cam 3 rotates counterclockwise as indicated by arrow 4. When the cancel cam 3 makes contact with a cancel ratchet 5, ratchet mount 6 rotatively moves with point A as a pivot against compression spring 7. If the distance from the pivot A to the point B at which the compression spring 7 acts on the ratchet mount 6 is compared with the distance from the pivot A to the point C at which the cancel cam 3 makes contact with the cancel ratchet 5, the latter is about double the former. Therefore, according to the principles of the lever and fulcrum, about half the action force of the compression spring 7 is required for the cancel cam 3 to raise the ratchet mount 6.

After the cancel cam 3 has passed, the ratchet mount 6 is energetically returned by the action of the compression spring 7, causing the cancel ratchet 5 to collide with stopper 8. At this moment, a noise is generated, which displeases the driver of the motor vehicle.

In this construction, depending on the rotating position of the steering wheel, when the ratchet mount 6 is moved by the operation of the control lever, the cancel ratchet 5 of the ratchet mount 6 may contact and interfere with the cancel cam 3. When the control lever is operated against such interference, the ratchet mount 6 is required to act for compressing the compression spring 7. In this case, unless the control lever is operated with about half the action force of the compression spring 7 added to the control force otherwise ordinarily required, the control lever cannot be moved. Thus, depending on the rotating position of the steering wheel, the operation of the control lever becomes abnormally heavy and is a disadvantage.

Several means were proposed to decrease or remove the undesirable noise. They include the formation of a sliding slope on the cancel ratchet for easing the collision with the stopper, the formation of an elastically deformable tongue-like part in the cancel ratchet for avoiding the direct contact with the stopper, and so on.

The noise can be decreased or removed to some extent by any of those conventional means, but the latter above named problem that the operation of the control lever becomes abnormally heavy when the cancel ratchet interferes with the cancel cam is not solved.

SUMMARY OF THE INVENTION

The self-canceller for a turn signal indicator of the present invention comprises the following features: (a) its body has three recesses formed; (b) the body is provided with a movable bracket capable of rotating; (c) a control lever is fastened to the movable bracket; (d) two side stoppers, a center stopper, and a spring housing are fastened to the movable bracket; (e) an engaging ball and a compression spring are contained in the spring housing; (f) a ratchet mount is provided between the center stopper and the compression spring; (g) the compression spring is supported by the engaging ball at one end and by the ratchet mount at the other end; (h) the engaging ball can be engaged with any of the three recesses of the body according to the rotary movement of the movable bracket; (i) two cancel ratchets are formed on the ratchet mount; and (j) when the cancel cam moving in the rotating direction of the control lever makes contact with either of the cancel ratchets, the ratchet mount can rotate with a point on the center stopper as a pivot against the compression spring.

Thus, the present invention permits to provide a self-canceller for a turn signal indicator, which can eliminate the abnormal heaviness in control lever operation and can decrease the noise respectively generated when the interference between the cancel ratchet and the cancel cam takes place during left-turn or right turn operation.

BRIEF DESCRIPTION OF THE DRAWING

The present invention is described below in detail with reference to the accompanying drawings which show preferred embodiments.

DETAILED DESCRIPTION OF THE INVENTION

Figure 2:
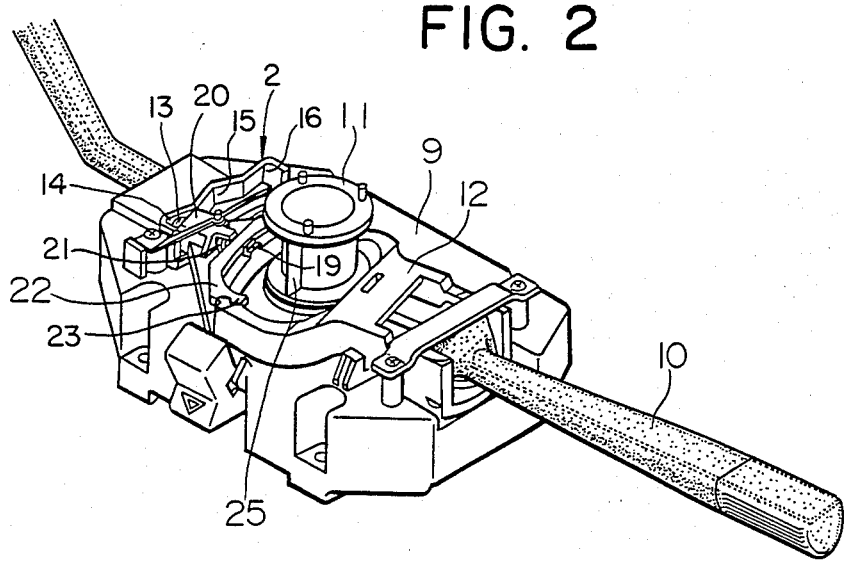
FIG. 2 is a perspective view showing an entire self-canceller for a turn signal indicator equipped with an example of the present invention.

FIG. 2 is a perspective view showing an entire self-canceller for a turn signal indicator equipped with an example of the present invention. The body 9, control lever 10, cylinder 11 for fastening the steering wheel and cancel cam 25 are the same as in the conventional canceller. In the present invention, the composition of the portion in relation with the movable bracket 12 is characteristic.

Figure 1:
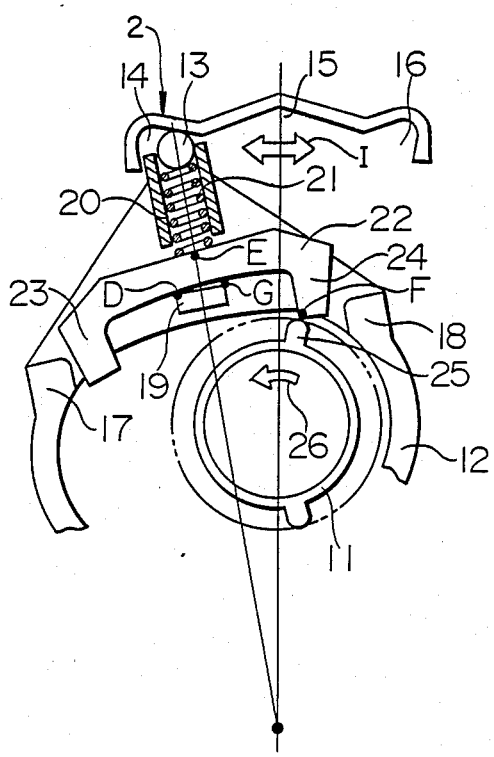
FIG. 1 is a partial plan view of the canceller shown in FIG. 2.
Figure 3:
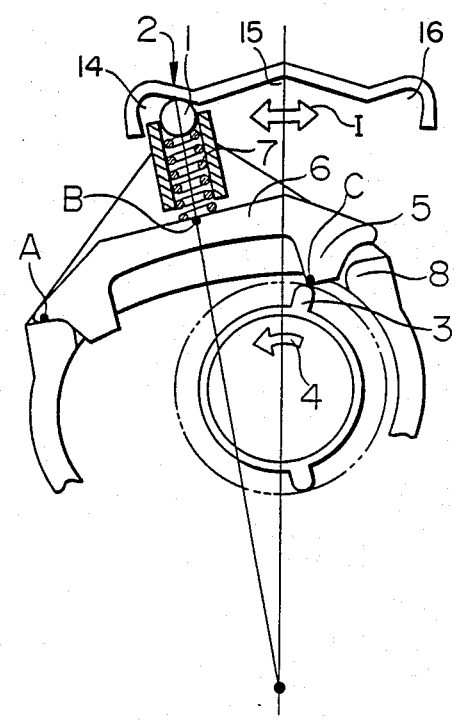
FIG. 3 is a partial plane view of a conventional self-canceller for a turn signal indicator.

FIG. 1 is a partial plan view of the canceller shown in FIG. 2, and expresses the features of this embodiment best. This drawing shows a state where an engaging ball 13 is engaged with a left recess 14 out of three recesses 14, 15 and 16, with the control lever 10 rotated counterclockwise, i.e., a state where the turn signal flasher indicates left turn. The body 9 is provided with a movable bracket 12 capable of rotating. The control lever 10 is fastened to the movable bracket 12. Two side stoppers 17 and 18, a center stopper 19 and a spring housing 20 are also fastened to the movable bracket 12. An engaging ball 13 and a compression spring 21 are contained in the spring housing 20. Between the center stopper 19 and the compression spring 21, a ratchet mount 22 is provided. The compression spring 21 is supported by the engaging ball 13 at one end and by the ratchet mount 22 at the other end. The engaging ball 13 can be engaged with any of the three recesses 14, 15 and 16 of the body 9 according to the rotary movement of the movable bracket 12, and stably hold the control lever 10 in position by the sufficient compressive force of the compression spring 21. Two right turn and left turn cancel ratchets 23 and 24 are formed on the ratchet mount 22.

If the steering wheel is rotated in the rotating direction of the control lever 10, the cancel cam 25 provided on the cylinder 11 fastened to the steering wheel rotates in the direction of an arrow 26, to contact the corresponding one of the cancel ratchets 23 or 24. At this moment, the ratchet mount 22 rotates with a point D on the center stopper 19 as a pivot against the compression spring 21. At this moment, the other cancel ratchet 23 is arranged not to contact the side stopper 17. If the distance from the pivot D to the point E at which the compression spring 21 acts on the ratchet mount 22 is compared with the distance from the pivot D to the point F at which the cancel cam 25 contacts the cancel ratchet 24, the latter is more than a few times the former. Therefore, according to the principles of the lever and fulcrum and owing to the small spring force of the compression spring 21, the force required for the cancel cam 25 to raise the ratchet mount 22 can be very small. Furthermore, even after the cancel cam 25 has passed causing the ratchet mount 22 to return to the original position, the cancel ratchet 24 does not collide with the side stopper 18 thus not generating any noise.

Furthermore, even when either of the cancel ratchets 23 and 24 of the ratchet mount 22 contacts and interferes with the cancel cam 25 during the movement of the ratchet mount 22 by the operation of the control lever 10, depending on the rotating position of the steering wheel, it is only required to add a very small force for less compressing of the compression spring 21, as compared to the otherwise ordinary control power. Therefore, it does not occur that the operation of the control lever 10 becomes abnormally heavy, and the control lever 10 can be operated with a control force little different from the ordinary control force.

When the cancel cam 25 moves in the direction reverse to the rotating direction of the control lever 10, the canceller functions in the same way as the conventional self-canceller. That is, when the cancel cam 25 gets into contact with the inside of the cancel ratchet 24, the ratchet mount 22 contacts the side stopper 18 of the movable bracket 12, to return the movable bracket 12 to its original neutral position. Thus, engaging ball 13 has been moved from left or right recess 14 or 16 to the neutral recess 15 by moving rightwards or leftwards in the direction of arrow I as shown in FIG. 1.

When the engaging ball 13 is engaged with the recess 16, point G on the center stopper 19 becomes the pivot of the ratchet mount 22.

As described above in detail, in the self-canceller for a turn signal indicator of the invention, if either of the cancel ratchets 23 or 24 of the ratchet mount 22 contacts the cancel cam 25 during the rotation of the steering wheel in the rotating direction of the control lever 10 or during the movement of the ratchet mount by the operation of the control lever, depending on the rotating position of the steering wheel, the ratchet mount 22 rotates with a point D or G on the center stopper 19 as a pivot against the compression spring. Therefore, according to the principles of the lever and fulcrum and owing to the very small compression of the compression spring, the force required in these cases can be very small. Thus, in the latter case, a feeling of resistance that the operation of the control lever is abnormally heavy does not occur at all. Furthermore, in the former case, since the cancel ratchets 23 or 24 do not collide with the side stoppers 17 or 18, unlike the conventional canceller, the generation of noise can be prevented as another effect of the present invention. A further other effect is provided that the compression spring 21 itself presses the engaging ball 13 into each of the recesses 14, 15, or 16 in the body by its sufficient compressive force, to stably hold the control lever in position.

Although the invention had been described and exemplified by way of specific embodiments, it is not intended that it be limited thereto. As will be apparent to those skilled in the part, numerous modifications and variations of these embodiments can be made without departing from the spirit of the invention or the scope of the following claim.

What is claimed is:

1. A self-canceller for a turn signal indicator comprising:

a main body;

a retaining element attached to said main body, said retaining element having three recesses, and said three recesses including left, neutral, and right recesses for retaining an engaging ball in a left, neutral, and right position;

a movable bracket rotatably mounted on said main body, said movable bracket including a left stopper, a center stopper, and a right stopper, and said center stopper having a left and a right pivot means;

a compression spring housing spaced from said center stopper and attached to said movable bracket;

a compression spring in said compression spring housing;

an engaging ball in said compression spring housing and between said retaining element and said compression spring, said compression spring biasing said engaging ball against said retaining element for retaining said engaging ball in one of said left, neutral, and right recesses;

a ratchet mount between said compression spring housing and said center stopper, said compression spring biasing said ratchet mount against said center stopper, and said ratchet mount including a left turn and a right turn cancel ratchet;

a control lever attached to said movable bracket for rotating said movable bracket relative to said main body for moving said compression spring housing relative to said retaining element for disengaging said engaging ball from one of said three retaining element recesses for moving said engaging ball into another one of said three recesses; and a cancel cam rotatably attached to said main body, said cancel cam being attachable to a rotatable steering wheel for rotation therewith, said cancel cam first engaging said left turn cancel ratchet for pivoting said ratchet mount about said left pivot means of said center stopper for compressing said compression spring when said engaging ball is retained in said left recess of said retaining element and a steering wheel is first rotated to the left from a neutral position, said cancel cam disengaging from said left turn cancel ratchet for causing said ratchet mount to return to its initial position when a steering wheel is rotated still further to the left, and said left turn cancel ratchet engaging said ratchet mount for moving said ratchet mount against said right stopper for moving said right stopper for moving said movable bracket to its initial position for moving said engaging ball to said neutral recess when a steering wheel is then rotated back in the opposite direction to the right.

* * * * *